United States Patent Office 3,786,135
Patented Jan. 15, 1974

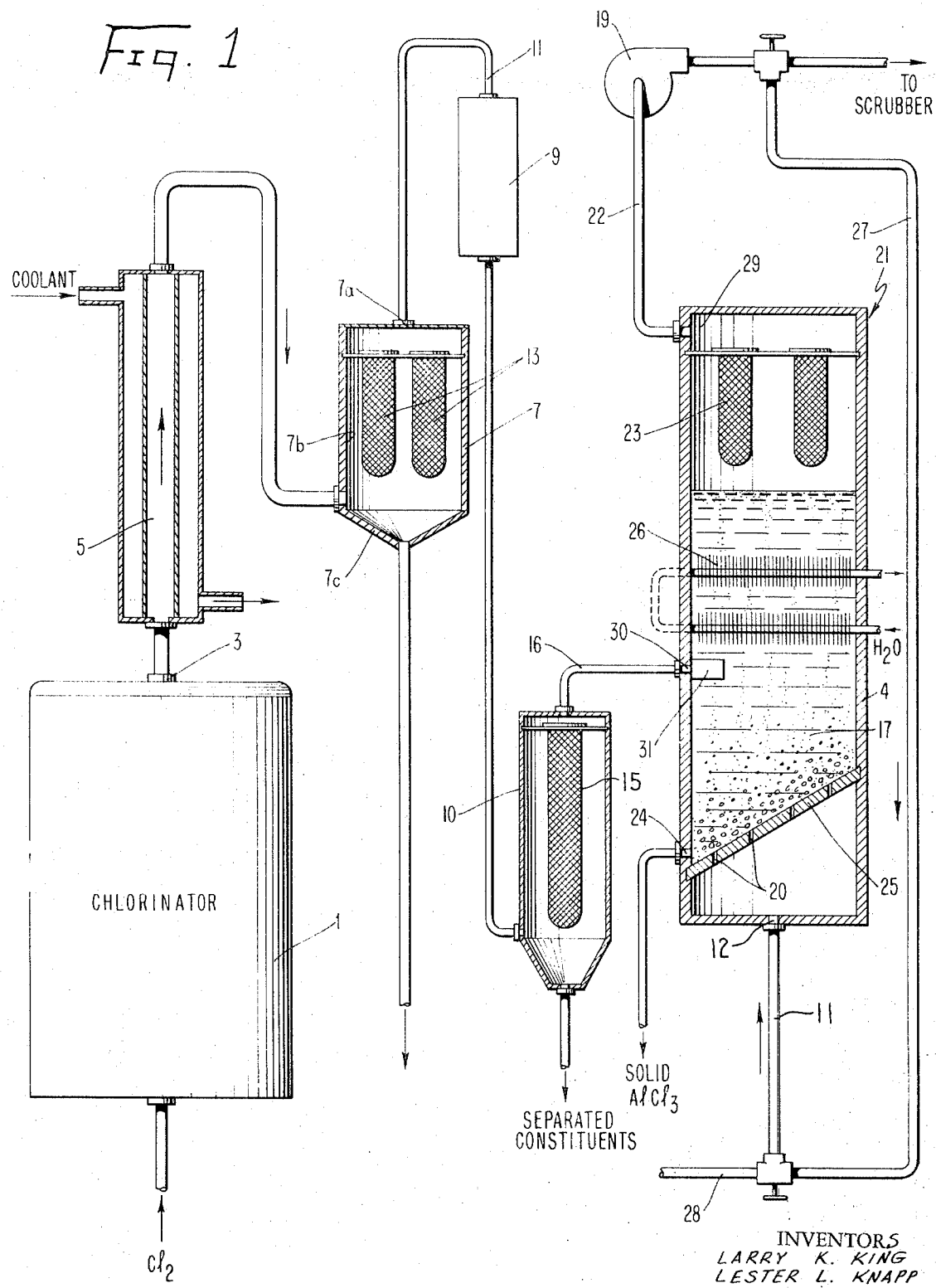

3,786,135
RECOVERY OF SOLID SELECTIVELY CONSTI-
TUTED HIGH PURITY ALUMINUM CHLORIDE
FROM HOT GASEOUS EFFLUENT
Larry K. King and Lester L. Knapp, Maryville, Tenn.,
Ronald C. Schoener, Lower Burrell, Pa., Nicholas
Kloap, Benton, Ark., Bernard M. Starner, Rockdale,
Tex., and John A. Remper, Lower Burrell, Pa., as-
signors to Aluminum Company of America, Pittsburgh,
Pa.
Filed Sept. 14, 1971, Ser. No. 180,276
Int. Cl. C01f 7/58, 7/60, 7/61
U.S. Cl. 423—496
9 Claims

ABSTRACT OF THE DISCLOSURE

Recovery of selectively constituted high purity alumi-
num chloride from the gaseous effluent of the chlorina-
tion of sodium contaminated alumina including the steps
of purifying such gaseous effluent to provide essentially
contaminant-free aluminum chloride in gaseous form in
a gaseous carrier through selectively cooling the hot
gaseous effluent to a first temperature range well above
the ambient condition condensation temperature of alumi-
num chloride yet sufficient to condense a selective por-
tion of the condensable constituents therein including a
substantial portion of the sodium aluminum chloride
values therein without condensing appreciable amounts
of aluminum chloride, initially separating from the cooled
gaseous effluent entrained particles and initially condensed
constituents, further reducing the temperature of the resi-
dual cooled gaseous effluent from the first stage separa-
tion to a second predetermined lower temperature range
still above the condensation temperature of aluminum
chloride to effect a further selective condensation and
separation of the remaining condensable constituents
therein, and directly desubliming the essentially contami-
nant-free gaseous aluminum chloride values from the puri-
fied residual gaseous effluent to selectively constituted
solid form in a fluidized bed of solid particles of alumi-
num chloride at controlled temperatures.

This invention relates to the production of aluminum
chloride and particularly to a process for treatment of
the hot gaseous effluent from the chlorination of alumina
for the quantity production of selectively constituted high
purity solid aluminum chloride.

Although the potential advantages of utilizing alumi-
num chloride as a source material in the electrolytic
production of metallic aluminum have long been recog-
nized, commercial realization thereof has been precluded
by the inability of the art to provide aluminum chloride
of sufficiently high purity and of a character as to be
utilizable therein and to provide aluminum chloride in
any significant required quantity therefor in an economi-
cally acceptable manner. The long standing incentive and
need for economically producible high purity aluminum
chloride has resulted in extensive experimental explora-
tion and evaluation of numerous suggested expedients for
obtaining such long desired result. However, to date none
of these suggested expedients has succeeded in satisfying
the long desired objective of commercial quantity produc-
tion of economically producible high purity aluminum
chloride.

In general, the reduction of alumina-containing mate-
rials with chlorine in the presence of reducing carbon in
some form to produce aluminum chloride is an old and
well-known reaction and one of the suggested expedients
referred to above utilized bauxite as the alumina-contain-
ing material. Such reaction proceeds vigorously and
usually results in the provision of aluminum chloride in
gaseous form in the elevated temperature gaseous effluent
thereof. Bauxite, however, normally contains many im-
purities including iron oxide, silica and titania. Since these
impurities readily react with chlorine in the presence of
carbon to form iron, silicon and titanium chlorides, the
separation and recovery of aluminum chloride values
from the hot reaction effluent from the chlorination of
bauxite has posed particularly difficult problems because
of the presence of multiple impurities therein and be-
cause of the inherent characteristics of aluminum chlo-
ride during separation operations, and especially because
of the influence of the vapor pressure of aluminum chlo-
ride on the degree of condensation thereof under am-
bient conditions.

Likewise, although moisture or other forms of hydrogen
are often present on the carbon intermixed bauxite used
for such chlorination reaction, this has not been hereto-
fore considered detrimental since such hydrogen is con-
verted to hydrogen chloride which can react with the iron
impurities present. Inasmuch as such gaseous aluminum
chloride reaction mixture necessarily required after-purifi-
cation, the presence of such by-products in the reaction
mixture was not only not of great concern, but the use
of formed hydrogen chloride to reduce iron impurities
present in the bauxite has been relied on as one manner
of converting such impurities to a form facilitating their
removal.

This invention, however, is particularly directed to
aluminum chloride production processes that employ
Bayer process alumina as an initial reactant, which, be-
cause of its caustic soda treatment, is normally contami-
nated with sodium impurities, e.g. soda ($Na_2O$), which
lead to the formation of sodium aluminum chloride and
other sodium based impurities during chlorination thereof.

This invention may be briefly described, in its broad
aspects, as an improved, efficient and economic process
for the production of selectively constituted high purity
solid aluminum chloride through the selective separation
of condensable and other imprities from the hot gaseous
effluent of the chlorination of sodium contaminated
alumina, such as Bayer process alumina that is essen-
tially free from iron, silicon and titanium impurities by
reducing the temperature thereof to below the chlorina-
tion reaction temperature and above the condensation
temperature of aluminum chloride under the ambient
conditions and economic quantity recovery of selectively
constituted high purity aluminum chloride by direct de-
sublimation from the residual gaseous effluent thereof. In
its narrower aspects, the invention includes the steps pro-
viding an essentially contaminant-free aluminum chlo-
ride in gaseous form in a gaseous carrier by initially cool-
ing such effluent to a first predetermined temperature
range of below the chlorination temperature and well
above the condensation temperature of aluminum chlo-
ride under ambient conditions to condense a selected
portion of the condensable constituents therein includ-
ing sodium aluminum chloride values and permit the
separation therefrom of entrained solid and liquid particles
and said initially condensed volatile constituents includ-
ing sodium containing reaction products, preferably fol-
lowed by a secondary cooling of the residual gaseous
effluent to a second and lower predetermined temperature
range above the ambient condition condensation tempera-
ture of aluminum chloride to selectively condense the re-
maining condensables other than the aluminum chloride
values contained therein and permit the second stage sepa-
ration therefrom of any remaining entrained particles and
further condensed constituents to provide a residual cooled
gaseous effluent comprising chlorine, phosgene and carbon
monoxides and containing essentially contaminant-free
gaseous aluminum chloride as a condensable constituent
therein and recovering said aluminum chloride values
therefrom as selectively constituted high purity particulates by direct desublimation in a self-replenishing fluidized bed of particulate aluminum chloride maintained at a predetermined temperature substantially below the upper ambient solidification temperature of aluminum chloride.

Among the advantages of the subject invention is the permitted efficient and economic commercial quantity production of selectively sized and contoured high purity aluminum chloride of a character particularly well suited for the production of aluminum metal by the electrolytic reduction thereof.

A primary object of this invention is the provision of an efficient and economical process for the continuous commercial quantity production of selectively sized and contoured high purity aluminum chloride from the gaseous effluent of the chlorination of sodium contaminated alumina.

Another object of this invention is the provision of an improved process for the economical recovery of high purity aluminum chloride values from the gaseous effluent of the chlorination of sodium contaminated particles of alumina by preliminary separation therefrom at predetermined temperature levels of entrained particles, e.g. solids and liquid particles, and condensable volatile constituents including sodium-containing reaction products, followed by direct desublimation of high purity aluminum chloride from the purified and essentially contaminant-free residual gaseous effluent thereof.

A further object of this invention is the provision of an improved process for recovering high purity aluminum chloride from the gaseous effluent from the chlorination of alumina and containing aluminum chloride, carbon oxides, entrained solid and liquid particles including alumina, carbon, aluminum oxychloride and/or aluminum hydroxychloride as well as condensable volatile constituents including volatilized sodium aluminum chloride, by initially cooling such hot gaseous effluent to a first predetermined temperature level below the chlorination reaction temperature and above the ambient condition condensation temperature of aluminum chloride to selectively condense a substantial portion of the condensable constituents therein including most of the sodium aluminum chloride values therein, further cooling the residual gaseous effluent therefrom to a second and lower temperature level to selectively condense effectively all of the remaining condensable constituents other than aluminum chloride therein, and directly desubliming the aluminum chloride values in a self-replenishing fluidized bed maintained at a temperature level substantially below the solidification temperature of such aluminum chloride, such steps being carried out in the substantial absence of hydrocarbons, free hydrogen-containing gases, free oxygen-containing gases and moisture.

It is still another object of the invention to provide an economic and efficient process for the continuous, commercial quantity production of selectively contoured, readily handleable and flowable high purity solid aluminum chloride particles of generally lobular contour that are particularly well suited for utilization in the electrochemical production of metallic aluminum.

A still further object of this invention is the provision of economically producible selectively constituted high purity aluminum chloride product.

A still further object of this invention is the provision of solid, selectively sized, high purity particles of aluminum chloride of generally lobular contour and characterized by the effective absence of planar exterior surfaces and relatively sharp protuberant angles.

Other and further objects and advantages of the present invention will become apparent from the following portions of this specification and from the accompanying drawing which illustrates the principles of this invention in conjunction with illustrative apparatus utilizable in the practice thereof and in which:

FIG. 1 schematically delineates suitable arrangements of apparatus utilizable in the practice of the inventive process in accord with the principles of this invention.

Figure 2A:
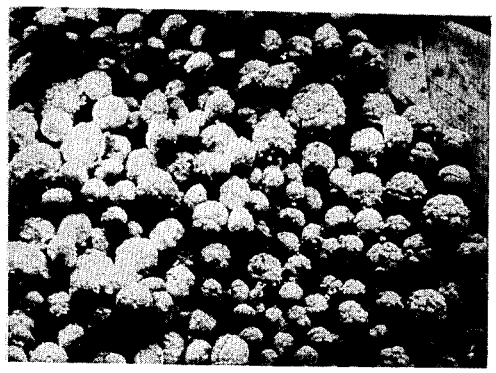
FIGS. 2a, 2b and 2c are photomicrographs, at 30, 200 and 500 magnifications respectively, illustrative of the selective configuration of a preferred product obtained through the practice of this invention.

The hot gaseous effluent emanating from the chlorination of sodium contaminated Bayer process alumina in the presence of carbon and in the substantial absence of hydrocarbons, free hydrogen containing gas, free oxygen containing gas and moisture will normally contain, in addition to gaseous aluminum chloride values, carbon oxides, preferably predominantly carbon dioxide, entrained particles of both solids and liquids, and condensable volatile constituents including amounts of voltailized sodium aluminum chloride values, i.e. corresponding substantially to the sodium impurities content of the alumina subjected to chlorination.

In accordance with the principles of this invention and by way of broad example, a hot gaseous effluent of the general type described, after exiting at 3 from a chlorination vessel 1, is initially cooled in a heat exchanger 5 to a first predetermined temperature range of between about 200–600° C., and preferably between 250–350° C., which is well below the chlorination reaction temperature and well above the ambient condition condensation temperature of aluminum chloride (which is normally about 180° C. subject to ambient vapor pressure conditions) and which will be effective to initially condense a substantial portion of the condensable constituents therein including a corresponding portion of the volatilized sodium aluminum chloride values present therein. Such thereby initially condensed constituents, which will include a substantial portion of the total sodium aluminum chloride value content thereof, in the form of a complex mixture with attendant aluminum chloride, together with most of the entrained solid and liquid particulates will be then separated from the gaseous carrier in a first stage separator 7. Such separated mass can constitute an appreciable proportion, i.e. as much as 15–25% by weight of the average alumina being chlorinated. Further cooling of the residual gaseous effluent from the first stage separation as by passage thereof through a second heat exchanger 9 reduces the temperature thereof to a second and still lower predetermined temperature range of between about 150–250° C. This second predetermined temperature range, which is still above the ambient condition condensation temperature of aluminum chloride will effect the condensation of essentially all of the remaining volatile constituents therein that are condensable above the condensation temperature of aluminum chloride, i.e. including essentially the remainder of the sodium aluminum chloride as a remaining condensable volatile constituent therein, and still without significant condensation of the still gaseous aluminum chloride values therein. Following the separation of such second stage condensates and any remaining entrained particulates from the now depleted residual effluent gas streams as effected by the described passage thereof through a second stage separator 10, such residual and depleted effluent gas stream comprising essentially contaminant-free gaseous aluminum chloride is introduced into a fluidized bed 17 of particles of aluminum chloride maintained at a third predetermined temperature range well below the ambient condition condensation temperature of aluminum chloride and at about 30–100° C., suitably within about 60–90° C. and preferably within the narrower range of 50–70° C. to effect the direct desublimation of the aluminum chloride values therein to solid form. "Desublimation" as utilized herein refers to the direct formation of solid aluminum chloride from the gaseous phase without any noticeable formation of an intermediate liquid phase.

The initial and second cooling steps and the concomitant separating steps are desirably also carried out in the substantial absence of moisture, preferably to the extent that the aluminum chloride epentually recovered will contain a total of less than about 0.3% and especially less than about 0.1% by weight of combined oxygen.

As noted above, the more readily condensable constituents or impurities in the hot gaseous effluent recovered from the chlorination zone will include sodium aluminum chloride values, usually in combination or complex form with a minor attendant amount of aluminum chloride, and entrained particles which include liquid particles such as aluminum oxychloride values and/or aluminum hydroxychloride values; and solid particles such as alumina, carbon, and intermixtures thereof. Accordingly, a selective yet substantial portion of the sodium aluminum chloride values will be condensed upon the initial cooling and will be separated in the first stage separator in the form of a complex mixture of sodium aluminum chloride with aluminum chloride, plus a substantial portion of the aluminum oxychloride and/or aluminum hydroxychloride, and the above noted solid particles. Essentially the remainder of the condensable volatile constituents in the residual initally cooled effluent gas will normally condense upon the further cooling thereof and such secondarily condensed remainder which may include any remaining complex mixture of sodium aluminum chloride with aluminum chloride, and any remaining solid or liquid particles as identified above may then be separated prior to the recovery of the aluminum chloride from the residual gaseous effluent.

While not completely understood at the present time, it is believed that the volatilized sodium aluminum chloride predominantly condenses as a result of the selective initial cooling of the hot gaseous effluent recovered from the chlorination reactor in such a way that under the ambient conditions the condensed sodium aluminum chloride, more or less in the form of a complex with attendant aluminum chloride, as well as the liquid aluminum oxychloride and/or aluminum hydroxychloride present, readily deposit on the entrained solids and to a great extent settle out as larger droplets than otherwise for collection even before reaching the operative physical separation area of the first stage separator 7. Consequently, instead of depositing as smaller droplets on the separating media thereof, such condensed volatile liquid constituents and entrained liquid particles more or less deposit on the entrained solids to form larger droplets which are readily separable without unduly burdening the separator apparatus employed.

The remainder of the volatile sodium aluminum chloride and any remaining aluminum oxychloride and/or aluminum hydroxychloride values which are still present in the residual gaseous effluent from the first stage separator, are thereafter condensed upon the second stage cooling of the gaseous effluent.

Such second stage condensed constituents, which will largely be in the nature of a mist or fog of

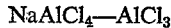

NaAlCl$_4$—AlCl$_3$ and any remaining entrained or dissolved solids such as alumina and carbon dust and liquids such as aluminum oxychloride and/or aluminum hydroxychloride, may then be separated from the further cooled gaseous effluent. Such can be efficiently and continuously removed in a simplified manner by a second stage separator 10 functioning essentially as a demister, e.g. a finer pored filter means, in an amount corresponding to the remaining impurities present.

In accordance with the foregoing, it will be realized that the sodium aluminum chloride values that condense out and which are removed at the first and second stages of separation generally condense to liquid form as a complex mixture with an appropriate minor amount of the aluminum chloride present, and such mixture generally contains in association therewith or dissolved therein not only concomitantly removed aluminum oxychloride and aluminum hydroxychloride but also traces of chlorine, phosgene, and the like, as well as alumina which stems from entrained alumina dust originally present or which forms by reaction of aluminum chloride with moisture which may be present, thereby also forming hydrogen chloride.

As noted above, the final recovery of the aluminum chloride from the purified gaseous effluent, and which may also contain chlorine, phosgene, carbon monoxide and dioxide, is effected by single stage direct desublimation in a fluidized bed 17 of aluminum chloride maintained at a temperature substantially below the solidification temperature of aluminum chloride and to thereby endow the bed with a self-replenishing character as well as providing a readily recoverable solidified aluminum chloride product of notable high purity and in a fine readily handleable and flowable form. More particularly, such aluminum chloride product will normally be of a purity of at least 99.5% and quantitative, economically producible solid aluminum chloride of a purity in excess of 99.8% is readily obtainable in accord with the principles of this invention. Such solid high purity product will also have an average particle size distribution of about 40–350 mesh (U.S. Sieve Series), and predominantly about 100–350 mesh which is particularly suited for immediate utilization in an electrolytic aluminum recovery cell for the efficient electrochemical formation of pure aluminum metal.

The use of markedly low desublimating or condensing temperatures in comparison to the solidification temperature of aluminum chloride, e.g. 30–100° C. as compared to 180° C., subject to the corresponding ambient conditions, and the agitation inherently present in the fluidized bed of particles of aluminum chloride surprisingly results in the formation of a preferred range of size of particles than that developed by desublimation at substantially higher temperatures in the vicinity of the actual ambient condition solidification temperature of aluminum chloride. Since such range of particle sizes contribute to easy handling for subsequent electrochemical conversion of the aluminum chloride to metallic aluminum, the use of desublimation temperatures well below the upper ambient limits thereof according to the principles of this invention is highly advantageous. Thus, rapidly quenching the gaseous aluminum chloride in the highly agitated fluidized bed from a temperature of about 150–250° C. to below 100° C., and preferably to about 60° C., in a single stage or step one would not have expected that readily handled and flowable particles would form.

The final condensation of the aluminum chloride is preferably carried out in the substantial absence of moisture so that the high purity solid form aluminum chloride so produced contains a total of less than about 0.5% by weight of free water and combined reaction products of water and aluminum chloride. Additionally, the condensation is preferably carried out in the substantial absence of free hydrogen-containing gas, free oxygen-containing gas, and non-volatile impurities under the ambient conditions sufficiently that the solid form alumina chloride produced by the condensing contains a total of less than about 0.3% and preferably less than 0.1% by weight of combined oxygen and non-volatile impurities.

As a result of the cascaded purification and desublimation recovery steps according to the invention, a highly purified and readily flowable solid particle aluminum chloride product is obtained having a total of less than about 0.3% by weight of combined oxygen and non-volatile impurities, i.e. which is essentially free from sodium, iron, silicon and titanium impurities, and preferably also having an average particle size distribution of about 40–350 mesh.

The described desublimation of the aluminum chloride can be carried out at negative or vacuum pressures, e.g.

down to about 0.1 atmosphere absolute, as well as at positive or elevated pressures, up to about 10 atmospheres absolute, subject to considerations of partial pressure of the aluminum chloride present under the ambient conditions. A preferred total operating pressure is about 1 atmosphere absolute.

Thus, by careful selection and control of the temperature of desublimation, and by using a fluidized bed of aluminum chloride particles in the condensation zone, it has been found that the particle size of the solidified aluminum chloride can be selectively controlled. At lower temperatures within the specified range of about 30–100° C., the average particle size of the desublimed product is generally smaller than those obtained at higher temperatures within such range. Depending on the particular temperature chosen, the aluminum chloride particles recovered will have an average particle size of about 40 to 350 mesh, and predominantly about 100–350 mesh. Operating temperatures of lower than about 30° C. for the fluidized bed are generally uneconomic and undesired since excessive cooling water costs are necessitated and excessive amounts of aluminum chloride fines are condensed out of the effluent, whereas temperatures above about 100° C. under the contemplated operating conditions result in the undesirable loss of undue amounts of uncondensed aluminum chloride in the gaseous effluent.

For example, even at a relatively low temperature of about 90° C., as compared with an aluminum chloride solidification temperature of about 180° C. at 1 atmosphere absolute and of about 150° C. at about 0.5 atmosphere absolute, a certain amount of the gaseous aluminum chloride values will not desublime since the vapor pressure conditions in the fluidized bed favor retention thereof in the gaseous state thereof. In this regard, under the ambient conditions of about .5 atmosphere, the vapor pressure of $AlCl_3$ is 1 mm. at 100° C., 0.32 mm. at 90° C. and 0.004 mm. at 60° C., which confirms the desirability of using condensation temperatures at the lower end of the stated range of 30–100° C., especially where lower ambient pressures are employed. Naturally, the presence of material that complex with the aluminum chloride may modify somewhat the aluminum chloride partial pressure in the system and thus the condensation temperature thereof.

Referring again to the drawings which exemplarily illustrate in schematic form certain presently preferred apparatus components suitable for use in the practice of the invention, the heat exchange cooling assembly 5 may suitably constitute a conventional shell and tube heat exchanger supplied with fluid coolant such as a liquid Dowtherm coolant (Dow Chemical Co. product). Alternatively, the initial cooling of the hot gaseous effluent could be effected by introduction of dry inert gas or solid particles of aluminum chloride, into direct contact with the hot gaseous effluent or by other suitable means.

The first stage separator 7 may suitably constitute a vertical filter chamber conventionally including a downstream outlet 7a at the upper end thereof for discharge therefrom of the residual initially cooled gaseous effluent and smooth imperforate perimetric side walls 7b of heat dissipating character dependently terminating in a collection hopper 7c for removal of the separated condensate therefrom. Included within the separator housing is a plurality of permeable filter members 13, suitably of stone or polished ceramic material.

The filter members 13 and the surrounding environment are kept at a sufficiently high enough temperature, e.g. about 200–500° C., so as to minimize, if not effectively preclude condensation of the remaining volatiles in the gaseous effluent.

While operation of the described system will normally effect a further reduction in the temperature of the residual effluent gas emanating therefrom, such temperature reduction can be supplemented by the passage of the residual effluent through the second stage heat exchanger 9 to bring the same within the desired second predetermined temperature level of about 150–250° C.

This further cooled residual gaseous effluent is then introduced into the second stage separator 10 wherein the further condensed sodium aluminum chloride-aluminum chloride complex values together with any remaining entrained or dissolved solids such as coked alumina and carbon dust and liquids such as aluminum oxychloride and/or aluminum hydroxychloride, are separated continuously as further impurities from the residual and non-further cooled aluminum chloride-containing gaseous effluent.

While the temperature of the gaseous mixture in the second stage separator 10 is sufficiently low to insure condensation of essentially the remainder of the condensable constituents present and especially sodium aluminum chloride and/or sodium aluminum chloride-aluminum chloride complex mixture, e.g. about 150–250° C., substantially no aluminum chloride will condense since the temperature is still above the condensation temperature of aluminum chloride under the ambient conditions. The gaseous effluent from the second separating stage will thus consist essentially of gaseous aluminum chloride of high purity which is essentially free from contaminants such as sodium aluminum chloride, aluminum oxychloride, aluminum hydroxychloride, alumina and carbon.

The second stage separator 10 may suitably comprise a permeable filter medium such as a stone filter 15 similar to those utilized in the first stage separator 7.

The above described residual gaseous aluminum chloride-containing effluent is introduced into the fluidizing bed chamber at a location remote from any contact surfaces in the vessel, to prevent undesired or premature condensation of the gaseous aluminum chloride to liquid or solid phase at the inlet and at any such contact surfaces with consequent plugging and insulating deterioration of heat exchange surfaces therein due to the hard and abrasive resistant character of the solid aluminum chloride. Likewise, the temperature, vapor pressure and locus of desublimation must be controlled to avoid premature and detrimental condensation of the gaseous aluminum chloride at locations other than that heretofore described to effectively avoid clogging of the inlet entrance and deposition on cold surfaces of the chamber.

As illustrated in the drawing, the cooled and purified aluminum chloride-containing residual gas which will be at a temperature that is sufficiently high to preclude condensation of the aluminum chloride values therefrom under the ambient condition is introduced through a feed line 16 into a fluidized bed of particles of aluminum chloride disposed within a chamber 4. The fluidized bed chamber 4 includes a fluidizing gas distribution inlet 12 at its lower end supplied with fluidizing gas through line 11, a separator 21, suitably a permeable filter medium 23 and a residual gaseous effluent outlet 29 at its upper end connected to an outlet conduit 22, and an aluminum chloride outlet 24 at the dependent terminus of inclined perforator distribution plate 25 disposed adjacent the bottom of the chamber for withdrawing condensed aluminum chloride solids therefrom. Disposed within the fluidized bed is a heat exchanger such as finned coils 26 for cooling the contents thereof and for maintaining the temperature of the bed within predetermined ranges. The purified residual gas exiting from the second stage separator 10 and containing the gaseous aluminum chloride values is introduced into the fluidized bed at a location remote from the cooling fins and from any contact surfaces therein.

A residual gaseous effluent recycle conduit 27 is connected intermediate the residual gaseous effluent outlet conduit 22 and the fluidizing gas distribution inlet 20 to permit the recycling and use of portions of the residual gaseous effluent as fluidizing gas. For such purpose, a compressor or pump 19 is desirably interposed in the outlet conduit 22. Alternatively, an independent source of fluidizing gas can be fed via supply line 28 for fluidizing the bed, instead of or in addition to the residual effluent gas fed via recycle conduit 27.

The inlet 30 for the gaseous aluminum chloride-containing gas is desirably provided with means to maintain the temperature of the incoming gas at an elevated value, such means shown schematically at 31, may suitably comprise auxiliary heating means, such as electrical resistance heating means, or may comprise heat insulation material, such as quartz, alumina, graphite, asbestos and the like, at the entrance thereof to minimize, if not prevent, premature cooling and liquification or solidification of the gaseous aluminum chloride passing therethrough which would tend to clog the same to impede or otherwise deleteriously affect the desired condensation or desublimation operation.

Because of the need to avoid premature condensation of the gaseous aluminum chloride at locations other than in the fluidized bed itself, considering the ambient conditions, the entrance of inlet 30 desirably projects appreciably into the bed and terminates remote from all structural surfaces therewithin including the walls of the chamber and the cooling means 26. In this way, as the incoming gaseous chloride-containing carrier enters the condenser chamber 4 in such manner as to immediately contact the bed particles the aluminum chloride values therein will condense before there is any chance of contact thereof with the adjacent apparatus surfaces. By the time the mixture of residual gaseous effluent and fluidizing gas exits from the top of the bed, the aluminum chloride values therein have sufficiently changed to solid phase and built up in solid particle form to avoid significant entrainment in the exiting gaseous mixture and is heavy and hard enough to operate as a particle component of the fluidized bed in the vicinity of the chamber walls and cooling means without danger of deposition thereon.

The ambient conditions at the locus of condensation should be such that the vapor pressure of the aluminum chloride is just low enough to desublime the same to solid form without causing any deposition of residual aluminum chloride either in solid or liquid form on the surface of the permeable filter medium 23 of the separator 21.

As previously noted, the herein described method of purification results in the provision of a gaseous effluent consisting essentially of contaminant-free aluminum chloride in gaseous form in a gaseous carrier and from which commercially utilizable quantities of solid high purity aluminum chloride may be economically recovered, as for example by condensation, therefrom. Such recovered aluminum chloride product will normally be of a purity of at least 99.5% and purities of 99.8% and better are readily obtainable in quantity production operations. More specifically, practice of the subject invention permits the economic attaining of solid aluminum chloride in quantity production that is essentially free of sodium, iron, silicon and titanium impurities and having a total nonvolatile, including combined oxygen, content of less than .3%, desirably of less than .1% and preferably of less than .03%. Aluminum chloride having less than .1% of combined oxygen and other non-volatile content is particularly suited for utilization in electrolytic reduction cells for production of aluminum and thus markedly contributes to a long sought after objective in this art.

Figure 2B:
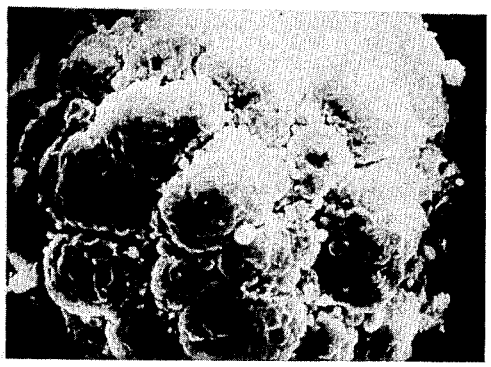
Figure 2C:
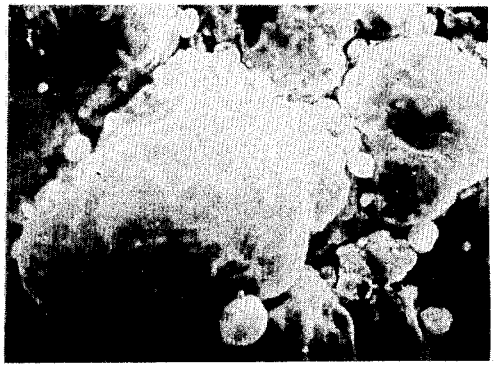

The singular nature of the product resulting from the hereinabove described direct desublimation recovery of aluminum chloride values is illustrated, under various magnifications in FIGS. 2 and 3 of the drawings. As best shown in FIG. 2a (under 30× magnification) the particles of aluminum chloride are of generally spheroidal character presenting a generally lobate curvilinear external contour and characterized by a marked absence of planar exterior surfaces and relatively sharp protuberant angles that are normally characteristic of fracture planes or the like. As becomes apparent from FIGS. 2b and 2c the particles of aluminum chloride are compositely constituted of agglomerated, cemented or otherwise autogenously bonded pluralities of smaller sized particles of rather widely varying dimension but of generally spheroidate character. Because of such composite constitution the exterior surface of the particles, while still curvilinear in character, are of generally lobular and bullate character and present marked localized departure from true spheroidal character and hence the term "lobular" will be herein utilized to describe the general character of the resultant particles.

Figure 3A:
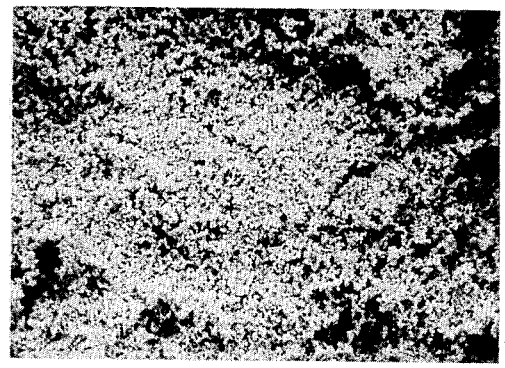
FIGS. 3a, 3b and 3c are photomicrographs, at 30, 200 and 500 magnifications respectively, illustrative of the selective configuration of a smaller sized product obtained through the practice of this invention.
Figure 3B:
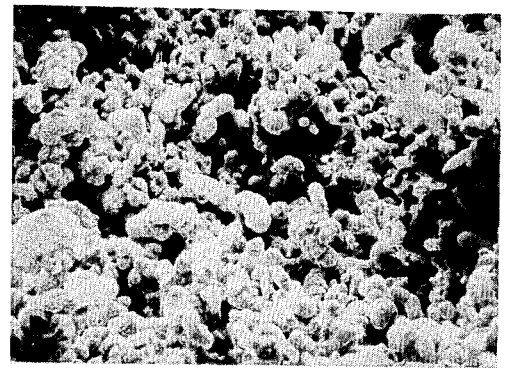
Figure 3C:
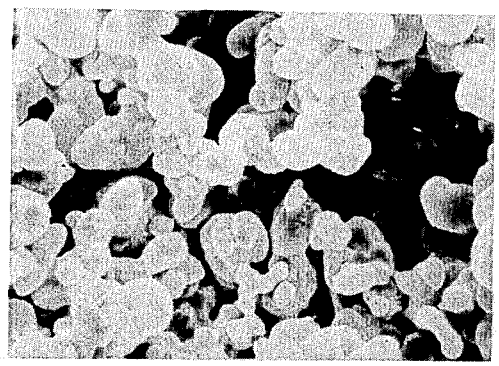

FIG. 3a illustrates (under 30× magification) a much finer aluminum chloride product obtainable by the practice of this invention. As evidenced by FIGS. 3b and 3c however the particles here are of markedly more lobate character. It is equally apparent however that the particles again present a generally lobular curvilinear external contour and are characterized by a marked absence of planar exterior surfaces and relatively sharp protuberant angles and are compositely constituted of agglomerated or otherwise joined pluralities of smaller sized particles of widely varying dimensions but of generally spheroidate or lobate character.

The solid lobular aluminum chloride particles of generally curvilinear contour of the invention essentially contain rounded lobes of lobules which often impart an apparent bullate, blistered and/or nodular composite surface configuration.

As will now be apparent to those skilled in this art the generally lobate character of this product differs markedly from conventionally produced aluminum chloride that is commercially available. Not only does this new material provide marked advantages in both handling and flowability but the herein described invention avoids any crushing or grinding operation with their attendant contamination with impurities from the equipment employed but more significantly avoids exposure of the aluminum chloride product to the air with its ever attendant hazard of contamination by air borne moisture.

The new product obtained through the practice of this invention has a bulk density in the range of about 75 to 105 lbs. per cu. ft. (for a particle size range of from about 40 to 350 mesh). Samples of FIG. 3 type product have been found to have an angle of repose in the range of about 35° to about 41°, and a mean of about 38°, when measured in a dry nitrogen atmosphere by the International Standards Organization Method ISO/PC47 (Secretariat 247) 424 for measurement of angle of repose of alumina. Because of the greater spheroidicity of the FIG. 2 type product, lower angles of repose will normally be characteristic thereof. As a matter of caution, however, it should be noted that the magnitude of the numerical comparative criteria of this latter characteristic depends largely upon the measurement techniques employed and there is little, if any, standardization in such measurement techniques generally, and the requirement of maintaining this particular product in a contaminant-free environment further complicates the problems of measurement thereof.

EXAMPLE

The following example is set forth to illustrate without limitation, various features of the present invention.

Gaseous effluent from the chlorination of coked sodium contaminated alumina at about 700° C. is fed to an indirect heat exchange cooling conduit 5 fed with Dowtherm coolant in an amount sufficient to cool the gaseous effluent to about 250° C. Such gaseous effluent contains vaporous or gaseous aluminum chloride as well as carbon dioxide and carbon monoxide, together with entrained dust including carbon and coked alumina as well as residual impurities present in the starting material. Specifically, the gaseous effluent has a total of less than 0.3% by weight free oxygen and a total of less than 0.5% by weight free water and combined water constituting reaction products of water and aluminum chloride.

The 250° C. cooled gaseous effluent is then separated from entrained dust and liquids particles and thereby condensed volatiles in the first stage separator 7. Such entrained dust and liquids particles and condensed volatile constituents so separated include sodium aluminum chloride-aluminum chloride eutectic mixture, in consequence of sodium impurities present in the starting alumina, as well as aluminum oxychloride, aluminum hydroxychloride, alumina and carbon, and traces of chlorine, hydrogen chloride and phosgene, all of which are continuously recovered more or less in the form of a partially dissolved mass. The condensed volatile constituents therein are those which condense out as a result of the cooling of the gaseous effluent from the chlorination temperature to 250° C.

This recover mass can amount to as much as 17% by weight of the average content of the chlorinator bed and about 12% by weight of such mass will constitute sodium impurities calculated as $Na_2O$, i.e. in the form of a sodium aluminum chloride-aluminum chloride eutectic mixture.

The residual effluent gas leaving the first stage separator 7 is then further cooled to about 200° C. and introduced into the second stage separator 10 wherein the remaining content of sodium aluminum chloride-aluminum chloride complex mixture, aluminum oxychloride and aluminum hydroxychloride, and any residual alumina and carbon dust, and any remaining traces of chlorine, hydrogen chloride and phosgene occluded therewith, which meanwhile condense more or less as a mist, are removed. These further impurities present in the gas, including the condensables which posses a higher condensation temperature than that of aluminum chloride under the ambient conditions, are conveniently removed at this point so as to provide a relatively pure final gaseous effluent in outlet line 16 containing essentially only aluminum chloride, carbon dioxide and carbon monoxide as well as trace amounts of other impurities, e.g. chlorine, hydrogen chloride, phosgene, carbon tetrachloride, and the like, from which the aluminum chloride is readily recovered.

Such relatively pure gaseous effluent at about 200° C. enters the chamber 4 containing a fluidized bed 17 of solid particles of relatively pure aluminum chloride with an average size distribution of about 48 to below 325 mesh (see below) maintained in fluidized condition initially by passage of gas upwardly through distribution inlet 20.

The bed 17 is cooled by passing water through cooling coils 26 extending through the bed so that the entering gas is rapidly quenched to about 60° C. in the relatively pure aluminum chloride particles maintained in the fluidized bed.

Although not fully understood at the present time, the quenched or cooled gaseous aluminum chloride apparently forms solid nuclei particles which build up to larger particles and/or deposit on other solid aluminum chloride particles already present in the bed. As the particles of aluminum chloride increase in size, they are removed constantly from the bed via outlet 24, in an average particle size distribution as noted below. The average residence time of the aluminum chloride in the condenser bed is about 2.5 hours.

The off gas from the fluidized bed 17 is passed through the filter assembly 21 causing the return of entrained aluminum chloride solids and dust directly back to the bed 17.

The aluminum chloride product recovered via outlet 24 is a relatively fine and flowable highly purified desublimated solid product, which is essentially free from sodium, iron, silicon and titanium impurities, and which has less than about 0.3% by weight total content of combined oxygen and non-volatile impurities, a low content of adsorbed carbon dioxide and phosgene (trace amounts), and average particle size distribution of:

| | Percent |
|---|---|
| +48 mesh (retained) | 1 |
| −48 to +80 mesh | 2 |
| −80 to +100 mesh | 10 |
| −100 to +200 mesh | 47 |
| −325 mesh (passes through) | 40 | and a density of about 75–105 lbs./ft.³, which is particularly well adapted for utilization without further treatment to produce metallic aluminum in an aluminum chloride electrochemical cell.

By way of further example, analysis of two representative samples revealed the following composition, the metal being stated as chlorides:

| | Percent | |
|---|---|---|
| | A | B |
| $SiCl_4$ | .008 | .008 |
| $FeCl_3$ | .041 | 0.55 |
| $TiCl_4$ | .005 | .005 |
| $NaCl$ | .02 | .03 |
| $CaCl_2$ | .000 | .004 |
| $MgCl_2$ | .001 | .004 |
| $ZnCl_2$ | .004 | .002 |
| $CuCl_2$ | .000 | .000 |
| $CaCl_3$ | .015 | .012 |
| $VCl_3$ | .0003 | .0006 |
| $MnCl_2$ | .0003 | .0004 |
| $CrCl_3$ | .0015 | .003(2) |
| $BCl_3$ | .006 | .001 |
| $LiCl$ | .002 | .009 |
| $NiCl_2$ | .004 | .009 |
| Non-volatiles (essentially oxides) | <.035 | <.035 |
| $AlCl_3$ | (¹) | (¹) |

¹ Balance.

What is claimed is:

1. In the production of aluminum chloride by the chlorination of sodium contaminated alumina, a process for selectively recovering high purity aluminum chloride from the hot gaseous effluent thereof containing aluminum chloride values, carbon oxides, aluminum oxychloride values, volatilized sodium aluminum chloride values and entrained particles of alumina and carbon, comprising the steps of initially cooling said hot gaseous effluent to a first predetermined temperature range below the chlorination reaction temperature and well above the ambient condition condensation temperature of aluminum chloride effective to selectively condense a first portion of the sodium aluminum chloride values therein, separating such initially condensed values and entrained particles from said gaseous effluent, further cooling the residual gaseous effluent therefrom to a second and lower predetermined temperature range above the ambient condition condensation temperature of aluminum chloride effective to condense a high proportion of the remaining volatile constituents therein that are condensable above the condensation temperature of aluminum chloride, separating such secondary condensate from such gaseous effluent, and directly desubliming high purity aluminum chloride values from such effluent in a fluidized bed of aluminum chloride particles at a third predetermined temperature range below the ambient condition condensation temperature of aluminum chloride.

2. process according to claim 1 wherein the initially separated values also include aluminum oxychloride values.

3. Process according to claim 1 wherein the secondarily separated values also include effectively all of the remaining aluminum oxychloride values, together with such high proportion of condensed sodium aluminum chloride values from the further cooled gaseous effluent.

4. Process according to claim 1 wherein said step of initially cooling said hot gaseous effluent reduces the temperature thereof to between about 200–600° C.

5. Process according to claim 1 wherein said step of further cooling the residual gaseous effluent reduces temperature thereof to between about 150–250° C.

6. Process according to claim 1 wherein said third predetermined temperature range is about 30–100° C.

7. Process according to claim 1 wherein said first predetermined temperature is between about 200–600° C., said second predetermined temperature is between about 150–250° C., said third predetermined temperature range is between about 30–100° C., and the solidified aluminum chloride is recovered in an average particle size distribution of about 40–350 mesh.

8. In the production of aluminum chloride by the chlorination of sodium contaminated alumina in the presence of a reducing agent, a process for selectively recovering high purity aluminum chloride from the hot gaseous effluent thereof containing aluminum chloride values, carbon oxides, aluminum oxychloride values, volatilized sodium aluminum chloride values and entrained particles of alumina and reducing agent, comprising the steps of initially cooling said hot gaseous effluent to a first predetermined temperature below the chlorination reaction temperature and well above the ambient condition condensation temperature of aluminum chloride effective to selectively condense a high proportion of the sodium aluminum chloride values therein, separating such initially condensed values and entrained particles from said gaseous effluent, further cooling the residual gaseous effluent therefrom to a second and lower predetermined temperature range above the ambient condition condensation temperature of aluminum chloride effective to condense a high proportion of the remaining volatile constituents therein that are condensable above the condensation temperature of aluminum chloride, separating such secondary condensate from such gaseous effluent, and directly desubliming high purity aluminum chloride values from such effluent in a fluidized bed of aluminum chloride particles at a third predetermined temperature range below the ambient condition condensation temperature of aluminum chloride.

9. Temperature gradient process for the removal of impurities from a hot gaseous effluent from the chlorination of sodium contaminated alumina containing aluminum chloride, condensable sodium aluminum chloride, carbon oxides, entrained particles of aluminum oxychloride, aluminum hydroxychloride, alumina and carbon, comprising the steps of initially cooling such hot gaseous effluent to a first predetermined temperature between about 200–600° C., to condense a substantial portion of the sodium aluminum chloride values, initially separating such condensed constituents and entrained particles from said gaseous effluent and reducing the temperature of said gaseous effluent to a second and lower predetermined temperature of between about 150–250° C. to condense essentially all of the remaining condensable volatile constituents therein which are condensable above the condensation temperature of aluminum chloride, separating the thereby condensed remaining constituents therein and essentially all of the remaining entrained particles from the thereby purified aluminum chloride containing further cooled gaseous effluent, and directly desubliming gaseous aluminum chloride to solid form from such purified further cooled gaseous effluent in a fluidized bed of solid particles of aluminum chloride maintained at a temperature substantially below the ambient condition solidification temperature of aluminum chloride.

References Cited
UNITED STATES PATENTS

| | | | |
|---|---|---|---|
| 1,566,269 | 12/1925 | Burgess | 423—135 |
| 2,446,221 | 8/1948 | Ferguson | 423—135 X |
| 3,175,883 | 3/1965 | Lindsay et al. | 423—133 |
| 3,406,009 | 10/1968 | Gould et al. | 55—71 X |
| 3,582,262 | 6/1971 | Tomany | 55—71 |

EDWARD STERN, Primary Examiner

U.S. Cl. X.R.

423—136, 463; 55—71